United States Patent [19]

Ponzielli

[11] Patent Number: 5,356,280
[45] Date of Patent: Oct. 18, 1994

[54] PUMP FOR PARTICULATE SOLIDS

[75] Inventor: Giuseppe Ponzielli, Solaro, Italy

[73] Assignee: GPW Machine S.a.S. di Giuseppe Ponzielli & C., Italy

[21] Appl. No.: 980,963

[22] Filed: Nov. 24, 1992

[30] Foreign Application Priority Data

Nov. 27, 1991 [IT] Italy .............. MI 91 A 003161

[51] Int. Cl.5 ............................... B29C 31/00
[52] U.S. Cl. .................... 425/201; 100/156;
141/73; 141/79; 198/642; 198/723; 406/52;
406/99; 406/102; 415/90; 425/205; 425/381.2;
425/449
[58] Field of Search .............. 100/156; 141/71, 73,
141/78, 79; 198/642, 723; 366/76; 406/52, 70,
71, 99–102; 415/90; 425/200, 201, 205, 222,
224, 381.2, 447, 449, 582

[56] References Cited

U.S. PATENT DOCUMENTS

| | | | |
|---|---|---|---|
| 1,980,589 | 11/1934 | Acree | 415/90 |
| 2,522,203 | 9/1950 | Williams | 406/52 |
| 2,586,607 | 2/1952 | Brown | 425/205 |
| 3,153,688 | 10/1964 | Marshall | 366/76 |
| 3,817,498 | 6/1974 | Frankfurth et al. | 198/642 |
| 3,884,855 | 5/1975 | Baumann et al. | 264/DIG. 69 |
| 4,102,109 | 7/1978 | Modra et al. | 53/24 |
| 4,142,805 | 3/1979 | Tadmor | 366/97 |
| 4,213,709 | 7/1980 | Valsamis | 366/76 |
| 4,421,412 | 12/1983 | Hold et al. | 366/76 |
| 4,516,674 | 5/1985 | Firth | 198/617 |
| 5,051,041 | 9/1991 | Firth | 406/99 |
| 5,200,204 | 4/1993 | Horton et al. | 425/381.2 |
| 5,223,199 | 6/1993 | Ponzielli | 264/349 |

FOREIGN PATENT DOCUMENTS 0326036 1/1989 European Pat. Off. .
0467842 1/1992 European Pat. Off. .

*Primary Examiner*—James Mackey
*Attorney, Agent, or Firm*—Wigman, Cohen, Leitner & Meyers

[57] ABSTRACT

A rotary channel pump apparatus for compressing solids that have an initial bulk density which is substantially lower than their structural density; the apparatus comprises a flow channel having an inlet and an outlet and includes: (i) an annular drag flow channel segment (L1) formed between a stationary outer wall member and a rotating circular inner wall member; and (ii) a straight channel segment (L2) formed between a first planar and stationary wall portion and a second planar and stationary wall portion; no axial cross-section of the flow channel between the inlet and the outlet is smaller than the axial cross-section at the inlet; a rotary feeder is connected to the flow channel near the inlet thereof for precompacting the particulate solid which is then passed through the flow channel to substantially increase the bulk density and to avoid melting and/or thermal degradation of the particulate solid when passing through the flow channel.

10 Claims, 2 Drawing Sheets

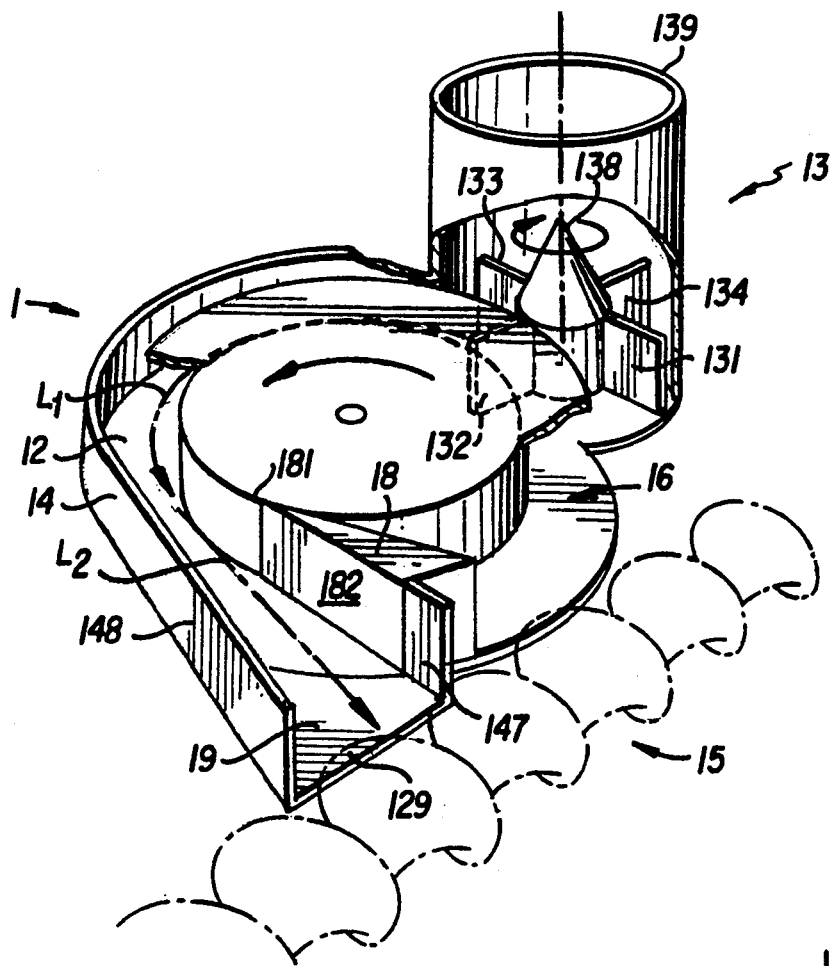
FIG. 1
FIG. 2
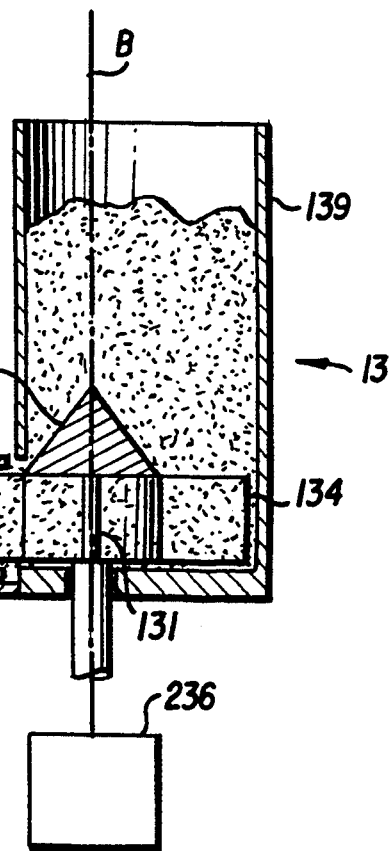

PUMP FOR PARTICULATE SOLIDS

CROSS-REFERENCE TO RELATED APPLICATION

This application is related to subject matter disclosed in my U.S. Pat. No. 5,223,199 issued on Jun. 29, 1993.

BACKGROUND OF THE INVENTION

1. Field of the Invention

The present invention generally relates to the art of processing particulate solids and specifically to a device or pump for conveying and/or compressing such solids.

2. Description of the Prior Art

My above-mentioned copending U.S. patent application discloses a method of pumping a particulate solid material and a pump (also referred to as a rotary channel pump or RCP) for compressing such particulate materials.

That pump utilizes a mechanism known as "dragflow" and is discussed in detail in my above-mentioned U.S. Pat. No. 5,223,199 the disclosure of which is incorporated herein by way of reference.

Drag flow devices for processing of solids have been disclosed in U.S. Pat. Nos. 4,516,674 and 5,051,041 to Firth, in U.S. Pat. No. 4,421,412 to Hold and Tadmore as well as in U.S. Pat. No. 4,231,709 to Valsamis. Further art pertaining to technological background as cited in my copending European patent application 91810547, corresponding to published European Patent Application No. 467,842 and U.S. Pat. No. 5,223,199, is identified as follows: EP-A-0 326 036, US-A-3 884885 US-A-4 102 109 and US-A-4 142 805.

Generally, processing of particulate solids, (i.e. in the form of particles) which have an "apparent" or "bulk" density that is significantly lower than the structural density of the material per se, such as "plastics" scrap, may present processing problems when conveying and/or feeding the material into a processor, e.g. when recycling thermoplastic scrap, waste, or refuse having a low bulk density into an extruder. In fact, future economics of using and notably of recycling plastics will depend substantially upon the way in which low bulk density solids can be processed economically.

As set forth in my above-mentioned U.S. patent the rotary channel pump disclosed therein is eminently suitable for compaction or pumping of particulate solids regardless of their bulk weight. In a preferred embodiment of the pump of my U.S. patent the particulate solids are precompacted before they are fed into the rotary channel pump, e.g. by a reciprocating ram.

It has been found that precompaction of the particulate solids according to the said embodiment of the rotary channel pump disclosed in my U.S. patent application can be achieved advantageously by means of a rotary feeder of the type operating essentially by displacement flow.

OBJECTS AND SUMMARY OF THE INVENTION

The term "particulate" in connection with "solids" as used herein refers to a normally solid material, i.e. solid at normal ambient conditions, in the form of particles of such sizes that the material can be processed as a virtually continuous "stream" of material, e.g. by conventional pneumatic or mechanical conveying means, and typically having average particle sizes in the range of from 0.1 mm to 100 mm, neither limit being considered critical.

Now, it is a main object of the present invention to provide for an advantageous modification of the precompaction aspect of the rotary channel pump disclosed in my U.S. Pat. No. 5,223,199 with a view to simple structure and economy of the apparatus as well as safe, effective and simple operation thereof.

This object and further advantages will be achieved, according to the present invention, in a rotary channel pump for processing, e.g. conveying, compacting, compressing, aggregating or drying, a particulate solid material essentially as disclosed in my U.S. patent; such a pump comprises a rotary flow channel having an inlet and an outlet and includes: (i) a substantially annular drag flow channel segment formed between a stationary outer wall member and a rotating circular inner wall member; and (ii) a substantially straight channel segment between a first essentially planar stationary wall portion and a second essentially planar stationary wall portion; the flow channel is designed to provide for smooth passage of the particulate solid material so as to prevent melting and/or thermal degradation of the particulate solid material therein.

According to the present invention the rotary channel pump comprises a rotary feeder that operates essentially by displacement flow and is connected to the inlet of the rotary channel for precompacting the particulate solids prior to passing them into the rotary channel.

Rotary feeders working essentially by displacement flow are known in the art, such as impeller or propeller pumps as well as "vane-type" pumps which may have an eccentric rotor with retractable blades, or a pair of counter-rotating and interfitting rotors, such as displacement bodies formed in the manner of an "8" or as toothed wheels and all of these could be used in combination with a rotary channel pump according to the invention. For many purposes, however, an essentially circular rotor having two, three, four, five, six or more radially protruding simple blades matching with the cross-sectional shape of the flow channel and extending into that channel are preferred. For this embodiment, the shape of the rotary wall element of the rotary channel pump will have an essentially regular cross-sectional shape (in an axial plane), e.g. circular, v-shaped or, preferably, an essentially rectangular shape.

The drive motor of the rotary channel pump may also serve as drive for the rotary precompactor but suitable gears and/or transmissions will then be required because the direction of rotation of the precompactor will generally be opposed to the rotation of the rotary channel pump.

Further, it will be preferred for most purposes that the speed of rotation of the precompactor can be controlled independently of the speed of the rotary channel pump so as to permit optimum adjustment of the operation of the precompactor in accordance with the supply and type of the particulate material that is to be processed.

For many purposes it is preferred to arrange the rotor and the displacement elements of the rotary displacement feeder within a housing that can serve as a hopper and has an upper and a lower end; the rotor of the feeder is arranged advantageously near the lower end of the housing, e.g. next to the bottom thereof, and may carry a flow controller, e.g. a smooth conical top, for directing the flow of particulate material within the hopper housing towards the rotary displacement feeder.

Normally, the outlet opening of the hopper housing is connected with the inlet opening of the rotary channel pump and the blades or other displacement elements of the rotary displacement feeder are arranged so that they will extend well into the rotary channel, preferably so as to cover most or all of the axial cross-section thereof.

The displacement elements of the rotary displacement feeder may, but need not, have an essentially planar surface and generally will have a shape adapted to substantially match the cross-section of the rotary channel.

BRIEF DESCRIPTION OF THE DRAWINGS

The invention will be further exemplified but not limited by means of the enclosed drawings illustrating certain preferred embodiments of the invention and in which:

FIG. 1 is a diagrammatic and partially broken away perspective view of a pump with a rotary displacement feeder according to the invention;

FIG. 2 is a sectional and partially broken away side view of an apparatus substantially as shown in FIG. 1.

The diagrammatic perspective view of solids pump 1 according to the invention comprises a displacement-type rotary precompactor 13 for passing a low bulk density feed material (not shown) along the path indicated by a dash—pointed line starting at the upper end of a housing or hopper 139. A rotor 138 having four blades 131, 132, 133, 134 is provided within hopper 139 near the lower end thereof and is connected to a drive 236 (cf. FIG. 2) for rotating in a direction indicated by a round arrow on top of rotor 138. The direction of rotation of rotor 138 is opposed to the direction of rotation of the rotary element 16 of pump 1.

Figure 3A:
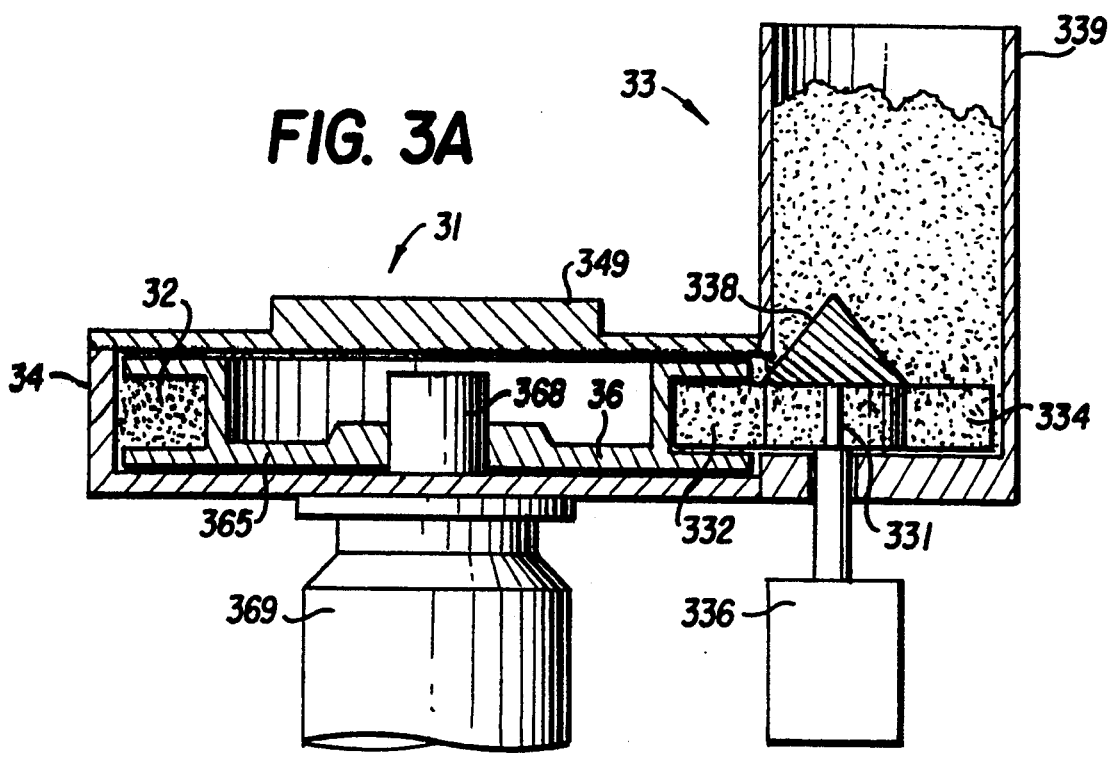
FIGS. 3A and 3B are semi-diagrammatic sectional side and top views of an inventive pump with a rotary displacement feeder.

The rotating displacement elements 131, 132, 133, 134 will move the feed material into the feeding end of flow channel 12 which is defined—as explained in more detail in EP 91810547.9—essentially by a first and substantially annular drag flow section L1 formed between stator 14 and rotor 16. A wedge-shaped deflector 18 is arranged so that its acute end or apex 181 is in sliding contact with those walls of rotor 16 that define the rotating portion of the drag flow segment L1 of channel 12. An essentially straight channel segment L2 is formed between a first and essentially planar wall portion 148 of stator 14 and a second and essentially planar wall 182 provided by deflector 18.

The upper and lower walls of the drag flow segment L1 are formed by the horizontal end flanges of rotor 16. A portion of the lower and upper (broken away) wall of segment L2 will also be formed by the flanges of rotor 16 but the end portion may be complemented by a continuation of stator wall 148, a bottom member 19, a continuation 147 of wall 182 and a top wall (not shown) so as to form an outlet end 129 of flow channel 12 preferably matching the cross-sectional geometry of the circular segment but with an outwardly increasing cross-sectional area.

While forward motion of the feed material within precompactor 13 is essentially caused by displacement, motion of the particles within annular channel segment L1 will be effected essentially by drag flow while continued motion in segment L2 of channel 12 will be caused increasingly (as downstream movement continues) by pressure flow, i.e. pushed by the material emanating from annular segment L1.

The compacted material that emerges from outlet 19 may pass into a further processing device, e.g. the barrel (not shown) of a conventional extruder 15 shown in broken lines to emphasize the optional nature of this additional processing device.

As shown in the sectional view of FIG. 2, drag flow rotor 16 and displacement rotor 138 are driven by separate motors, i.e. drive 269 and 236, respectively for individual control of direction and speed of rotation. Obviously, a single motor could be used if suitable gears are used but it is believed to be essential that the direction of rotation of the displacement rotor 238 is opposed to the direction of rotation of the drag flow rotor 16. As will be apparent from the drawings, the direction of rotation of drag flow rotor 16 depends upon the specific structure, and the specific design example illustrated in FIG. 1, for example, implies a clockwise direction of rotation if viewed from the top.

Figure 3B:
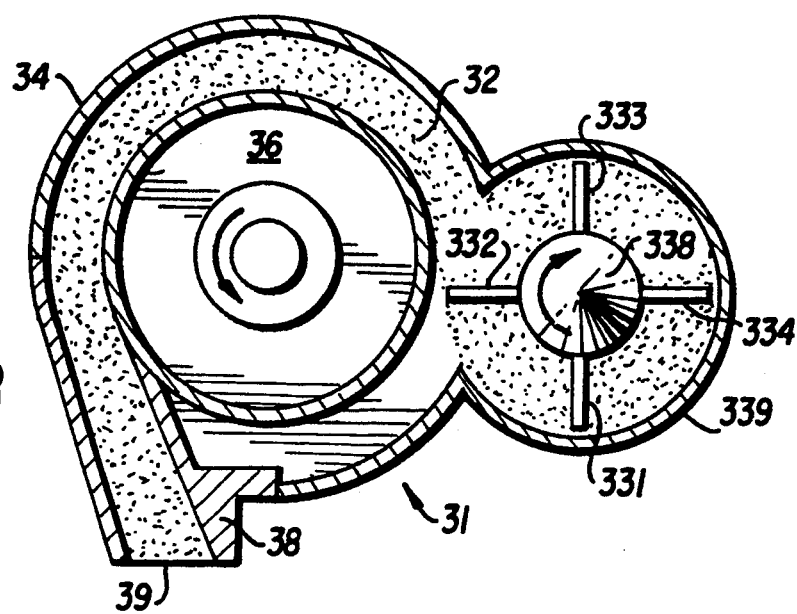

FIGS. 3A and 3B are semi-diagrammatic sectional views in vertical or axial (FIG. 3A) and horizontal or radial planes (FIG. 3B). The inventive pump is composed of the rotary channel portion 31 and the precompaction portion 33. Flow channel 32 is formed by stator 34, a monolithic rotor 36 formed by a circular bottom plate 365 plus attached flanges and a deflector 38 to define one side wall of the straight channel segment forming part of outlet end 39. Rotor 36 moves in the direction of the circular arrow under the impact of drive motor 369 and its connector or shaft 368. The stator housing is closed on its top side by a sealingly effective lid or cover 349 that can be removed for maintenance.

Rotor 338 of the displacement flow precompactor 33 is again arranged near the bottom of hopper 339 and is provided with a conical top for guiding the particulate solids from hopper 339 to displacement blades 331, 332, 333 and 334 rotating together with the rotor 338 because of motor 336. Generally, the rotary channel portion 31 of a pump according to the invention can be viewed as a compaction amplifier that is capable of compressing a low-bulk-density solid by a factor in the range of from about 20 to 50. Compression results in absolute terms may be controlled by initial bulk density (that is then multiplied by the above factor), on the one hand, and flow resistance at the outlet, on the other.

Since processing conditions at the outlet end will normally be determined by the processing device used downstream of a solids pump according to the invention and do not provide much room for choice, it is the upstream end where conditions for optimization can be varied. In other words, pre-compaction will provide a means to maximize the compaction effect of the rotary channel portion of the subject pump.

Now, as the rotary displacement feeder which is a feature of the subject pump is well capable to increase bulk density by a typical factor of at least about 10 it will be understood that even with an initial bulk (or stream) density of a particulate solid of only 5 grams per liter or below, a product stream density of about 500 grams per liter or more may be achieved in a single pass because of the amplification of compaction resulting from passage through the rotary channel of a pump according to the invention.

As a result, the lower the initial bulk density of a stream of particulate solids that is to be processed, the more advantageous is precompaction; for example, with very low initial bulk (or stream) densities of particulate solids, such as typically in recycling of thermoplastic polymers, product stream densities of 70% or more of the structural density of the processed solids material may be achieved with a pump according to the invention in a single pass.

Typically, the speed of rotation of the precompaction rotor of a pump according to the present invention will be at least as high as, and preferably higher than, the speed of rotation of the rotor of the rotary channel.

Generally, however, use of a pump according to the present invention is not limited to processing of thermoplastic polymers having a very low bulk density but can be used advantageously in many fields wherever particulate solids are processed, including production or processing of chemicals, foods, pharmaceuticals, cosmetics, plastics, agricultural chemicals, fertilizers, structural materials, moulding, paper production, petroleum industry including petrochemistry, recycling of recoverable materials, etc.

It is to be understood that the foregoing detailed description is given merely by way of illustration and that variations can be made therein without departing from the spirit of the invention.

Accordingly, what I claim is:

1. A rotary channel pump for processing a particulate solid material comprising a rotary flow channel having an inlet and an outlet and including:
   (i) a substantially annular drag flow channel segment formed between a stationary outer wall member and a rotating circular inner wall member, said annular drag flow channel segment having an upstream end communicating with said inlet, and a downstream end; and (ii) a substantially straight channel segment formed between a first substantially planar stationary wall portion and a second substantially planar stationary wall portion to provide for smooth passage of said particulate solid material through said flow channel and to prevent melting and thermal degradation of said particulate solid material within said flow channel, said substantially straight channel segment having an upstream end communicating with said downstream end of said annular drag flow channel segment, and a downstream end communicating with said outlet; said pump further including a rotary feeder connected with said inlet of said flow channel for precompacting said particulate solid material prior to passing it into said flow channel, wherein said rotating inner wall member is connected to a drive for rotating said inner wall member in a first direction of rotation and said rotary feeder comprising a housing having an upper and a lower end, and a rotor near said lower end of said housing and comprising at least one displacement element, said rotor being connected to a drive for rotating said rotor in a direction opposite said first direction of rotation of said inner wall member.

2. The pump of claim 1 wherein said at least one displacement element has an essentially planar-surface and a shape adapted to substantially match a cross-section of at least a portion of said rotary flow channel.

3. The pump of claim 1 wherein said rotor has a conical top for guiding said particulate solid material within said housing toward said at least one displacement element.

4. The pump of claim 2 wherein said rotor has a conical top for guiding said particulate solid material within said housing toward said at least one displacement element.

5. The pump of claim 1 wherein an axial cross-section of said annular drag flow channel segment is substantially defined by a wall portion of said stationary wall member and a wall portion of said rotating wall member such that the strength of frictional contact between said particulate solid material and said wall portion of said rotating wall member substantially exceeds the strength of frictional contact between said particulate solid material and said wall portion of said stationary wall member; and wherein said displacement element of said pump has a shape so as to substantially match said axial cross-section of said annular drag flow channel segment.

6. The pump of claim 2 wherein an axial cross-section of said annular drag flow channel segment is substantially defined by a wall portion of said stationary wall member and a wall portion of said rotating wall member such that the strength of frictional contact between said particulate solid material and said wall portion of said rotating wall member substantially exceeds the strength of frictional contact between said particulate solid material and said wall portion of said stationary wall member; and wherein said displacement element of said pump has a shape so as to substantially match said axial cross-section of said annular drag flow channel segment.

7. The pump of claim 1 wherein said rotor of said rotary feeder is provided with at least two displacement elements arranged in an essentially equidistanced relation around said rotor.

8. The pump of claim 2 wherein said rotor of said rotary feeder is provided with at least two displacement elements arranged in an essentially equidistanced relation around said rotor.

9. The pump of claim 3 wherein said rotor of said rotary feeder is provided with at least two displacement elements arranged in an essentially equidistanced relation around said rotor.

10. The pump of claim 4 wherein said rotor of said rotary feeder is provided with at least two displacement elements arranged in an essentially equidistanced relation around said rotor.

* * * * *